(12) United States Patent
Kim et al.

(10) Patent No.: US 11,285,993 B2
(45) Date of Patent: Mar. 29, 2022

(54) APPARATUS AND METHOD FOR CONTROLLING STEERING SYSTEM OF VEHICLE

(71) Applicants: Hyundai Motor Company, Seoul (KR); Kia Motors Corporation, Seoul (KR)

(72) Inventors: Chan Jung Kim, Whasung-Si (KR); Il Rae Park, Whasung-Si (KR); Young Eun Ko, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 211 days.

(21) Appl. No.: 16/527,401

(22) Filed: Jul. 31, 2019

(65) Prior Publication Data

US 2020/0164914 A1 May 28, 2020

(30) Foreign Application Priority Data

Nov. 26, 2018 (KR) .......................... 10-2018-0146972

(51) Int. Cl.
| | | |
|---|---|---|
| *B62D 5/04* | (2006.01) | |
| *B60W 40/103* | (2012.01) | |
| *B60W 50/00* | (2006.01) | |

(52) U.S. Cl.
CPC ......... *B62D 5/0466* (2013.01); *B60W 40/103* (2013.01); *B60W 50/00* (2013.01);
(Continued)

(58) Field of Classification Search
CPC .............. B62D 5/0466; B60W 40/103; B60W 50/00; B60W 2050/0026; B60W 2520/10; B60W 2520/125; B60W 2520/14
See application file for complete search history.

(56) References Cited

U.S. PATENT DOCUMENTS

| | | | | |
|---|---|---|---|---|
| 5,919,241 A | * | 7/1999 | Bolourchi | B62D 5/0466 |
| | | | | 701/41 |
| 6,415,215 B1 | * | 7/2002 | Nishizaki | B60T 8/1755 |
| | | | | 180/167 |

(Continued)

FOREIGN PATENT DOCUMENTS

| | | |
|---|---|---|
| EP | 1 849 682 A1 | 10/2007 |
| JP | 2003-154962 A | 5/2003 |

(Continued)

*Primary Examiner* — Jeff A Burke
*Assistant Examiner* — Joshua Alexander Garza
(74) *Attorney, Agent, or Firm* — Morgan, Lewis & Bockius LLP

(57) ABSTRACT

An apparatus and a method for controlling a vehicle steering system, which are capable of improving a sense of unity between driver's driving input and vehicle motion and the stability of the vehicle by estimating a side slip angle and performing return control, may include an assist torque determination module for determining assist torque for steering assist, a return control module for determining steering return torque for returning the steering wheel to a neutral position, a side slip angle estimation module for estimating a side slip angle, a side slip control module for determining a return control gain value in a response to the estimated side slip angle, a correction unit of correcting the determined steering return torque in a response to the return control gain value, and a torque compensation unit of determining final assist torque by compensating the determined assist torque with the corrected steering return torque.

14 Claims, 4 Drawing Sheets

(52) U.S. Cl.
CPC .............. *B60W 2050/0026* (2013.01); *B60W 2520/10* (2013.01); *B60W 2520/125* (2013.01); *B60W 2520/14* (2013.01)

(56) References Cited

U.S. PATENT DOCUMENTS

| | | | |
|---|---|---|---|
| 7,844,383 B2 * | 11/2010 | Shinozawa | B60T 8/172 |
| | | | 701/72 |
| 2005/0071061 A1 * | 3/2005 | Kato | B62D 6/003 |
| | | | 701/41 |
| 2006/0047391 A1 * | 3/2006 | Katou | B62D 5/006 |
| | | | 701/41 |
| 2010/0114449 A1 * | 5/2010 | Shiozawa | B60T 8/172 |
| | | | 701/90 |
| 2015/0232120 A1 * | 8/2015 | Aono | B62D 6/002 |
| | | | 701/42 |
| 2016/0059852 A1 * | 3/2016 | Yamakado | B60W 10/08 |
| | | | 701/41 |
| 2017/0057493 A1 * | 3/2017 | Sato | B60W 10/184 |
| 2017/0210414 A1 * | 7/2017 | Sato | B62D 6/003 |
| 2018/0186399 A1 | 7/2018 | Kim | |
| 2018/0304917 A1 * | 10/2018 | Michelis | B62D 5/0472 |
| 2019/0233005 A1 * | 8/2019 | Maeda | B62D 6/04 |
| 2020/0086913 A1 * | 3/2020 | Tsukahara | B62D 15/025 |
| 2020/0254996 A1 * | 8/2020 | Kashiwamura | B60T 7/22 |

FOREIGN PATENT DOCUMENTS

| | | |
|---|---|---|
| JP | 2008-230528 A | 10/2008 |
| KR | 10-0795102 B1 | 1/2008 |
| KR | 10-2018-0080401 A | 7/2018 |

\* cited by examiner

APPARATUS AND METHOD FOR CONTROLLING STEERING SYSTEM OF VEHICLE

CROSS-REFERENCE TO RELATED APPLICATION

The present application claims priority to Korean Patent Application No. 10-2018-0146972 filed on Nov. 26, 2018, the entire contents of which is incorporated herein for all purposes by this reference.

BACKGROUND OF THE INVENTION

Field of the Invention

The present invention relates to an apparatus and a method for controlling a steering system of a vehicle. More particularly, the present invention relates to an apparatus and a method for controlling a steering system of a vehicle, which are configured for improving a sense of unity between a driver's driving input and vehicle motion and the stability of the vehicle by estimating a side slip angle and appropriately performing return control with respect to the vehicle which is traveling.

Description of Related Art

In general, as a power steering system for reducing the steering force applied by the driver to steer a vehicle, there are known a hydraulic power steering (HPS) system, which assists the steering force applied by the driver using the hydraulic pressure generated by a hydraulic pump, and a motor driven power steering (MDPS) system, which assists the steering force applied by the driver using the output torque of an electric motor.

When the MDPS system performs a steering assist function in a response to the driver's steering wheel operation, the output torque (i.e., assist torque) of the electric motor (steering motor) for steering assist is controlled in a response to the traveling condition of the vehicle, providing more improved steering performance and steering sensation than the HPS system.

Therefore, the MDPS system, which is configured for changing and controlling the steering assist force generated by the output of the motor in a response to the traveling condition of the vehicle, is widely applied to vehicles that have recently been commercially available.

The MDPS system may include a steering angle sensor for detecting the steering angle (column input angle) formed by the driver's steering wheel operation, a torque sensor for detecting the steering torque (steering wheel torque or column torque) input through the steering wheel, a controller (MDPS ECU), and a steering motor (MDPS motor).

In the present configuration, the controller obtains driver steering input information, such as a steering angle, a steering angular speed, and steering torque, from the signals of the above sensors to control the driving and output of the steering motor.

Here, the steering angle represents the rotational position of the steering wheel, the steering angular speed is a rotational angular speed value of the steering wheel, which is derived from the differentiation of the steering angle, and the steering torque is torque applied by the driver to the steering wheel, i.e., driver input torque for steering.

When the steering torque, which is the driver input torque, is detected by the torque sensor, the controller controls the driving of the steering motor in a response to the detected steering torque to generate and output assist torque for steering assist.

In a commonly used MDPS system, the controller may be configured to control the output of the steering motor by controlling the current applied to the steering motor.

At the instant time, the controller is configured to determine an assist torque value, which is a target value of the motor output, based on information collected from the vehicle, such as driver's steering torque detected by the torque sensor, determines the amount of current which is tuned to correspond to the determined assist torque value, and applies the determined amount of current to the steering motor. Accordingly, the steering motor is driven to generate assist torque, which is force (steering assist force) for assisting the driver's steering force.

The constituent elements of the steering system, which are configured to transmit the driver's steering force applied through the steering wheel and the steering assist force generated by the motor, may include a steering column disposed below the steering wheel, a gear box configured to convert the rotational force from the steering column into the linear motion to change the direction of the tires, and a universal joint configured to transmit the rotational force from the steering column to the gear box.

The gear box may include a pinion gear, which receives the rotational force from the universal joint, and a rack bar, which may include a rack configured to be tooth-engaged with the pinion gear.

When the pinion gear rotates, the rack bar moves linearly in a leftward-and-rightward direction due to the rack. The force generated by the linear motion of the rack bar in the leftward-and-rightward direction is transmitted to the tires via a tie rod and a ball joint, changing the direction of the tires.

In the vehicle, a side slip angle $\beta$ is an angle that represents the degree of slippage of the vehicle relative to the direction in which the vehicle is traveling. As shown in FIG. 1 and FIG. 2, the side slip angle $\beta$ may be defined as an angle between the velocity direction D1 of the vehicle and the heading direction D2 of the vehicle.

The velocity of the vehicle is a velocity $V_x$ at which the vehicle travels in the longitudinal direction thereof. The velocity direction D1 of the vehicle shown in FIG. 1 and FIG. 2 may be defined as a tangential direction of the path of a curved road along which the vehicle turns.

When the vehicle is traveling, as the side slip angle $\beta$ is smaller, the velocity direction D1 of the vehicle and the heading direction D2 thereof come closer to each other, thus improving a sense of unity between the driver's driving input and the vehicle motion.

The side slip angle $\beta$ is related to the stability of the vehicle. As shown in FIG. 1, when the side slip angle $\beta$ of the vehicle has a positive (+) value, the heading direction D2 of the vehicle is oriented in the outward direction of the turning path. Therefore, the vehicle becomes more stable.

On the other hand, as shown in FIG. 2, when the side slip angle $\beta$ has a negative (−) value, the heading direction D2 of the vehicle is oriented in the inward direction of the turning path. Therefore, the vehicle may spin.

When the vehicle travels on a curved road, as the vehicle velocity $V_x$ increases, the side slip angle $\beta$ of the vehicle may gradually decrease from a positive value to a negative value. The characteristics of the side slip angle vary depending on the steer characteristics of the vehicle.

For example, in an understeer state, the side slip angle $\beta$ of the vehicle decreases to a negative value and converges to a certain level. In a neutral steer state, the side slip angle decreases to a negative value in proportion to the vehicle velocity $V_x$.

In an oversteer state, the side slip angle diverges to a negative value at a certain speed, which may cause the vehicle to spin.

As described above, when the vehicle is traveling, the side slip angle of the vehicle is related to a sense of unity between the driver's driving input and the vehicle motion and the stability of the vehicle. Therefore, there has been demand for a technology of improving a sense of unity between the driver's driving input and the vehicle motion and the stability of the vehicle by appropriately controlling the side slip angle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a steering system of a vehicle, which are configured for improving a sense of unity between a driver's driving input and vehicle motion and the stability of the vehicle by estimating a side slip angle and appropriately performing return control with respect to the vehicle which is traveling.

Various aspects of the present invention are directed to providing an apparatus configured for controlling a steering system of a vehicle, the apparatus including an assist torque determination module configured to determine assist torque for steering assist based on driver steering input information and vehicle state information collected from the vehicle, a return control module configured to determine steering return torque for returning a steering wheel to a neutral position, a side slip angle estimation module configured to estimate a side slip angle based on the vehicle state information collected from the vehicle, a side slip control module configured to receive the side slip angle estimated by the side slip angle estimation module and to determine a return control gain value in a response to the estimated side slip angle, a correction unit configured to determine final steering return torque by correcting the steering return torque, determined by the return control module, in a response to the return control gain value, and a torque compensation unit configured to determine final assist torque for steering assist by compensating the assist torque, determined by the assist torque determination module, with the final steering return torque, determined by the correction unit.

Various aspects of the present invention are directed to providing a method of controlling a steering system of a vehicle, the method including determining assist torque for steering assist based on driver steering input information and vehicle state information collected from the vehicle, determining steering return torque for returning a steering wheel to a neutral position, estimating a side slip angle based on the vehicle state information collected from the vehicle, determining a return control gain value in a response to the estimated side slip angle, determining final steering return torque by correcting the determined steering return torque in a response to the determined return control gain value, and determining final assist torque for steering assist by compensating the determined assist torque with the determined final steering return torque.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
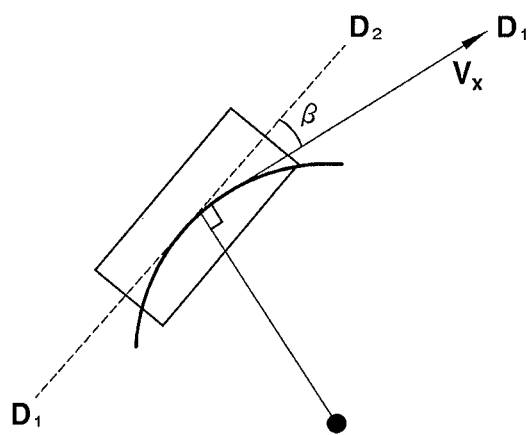
FIG. 1 and FIG. 2 are views showing a side slip angle.
Figure 2:
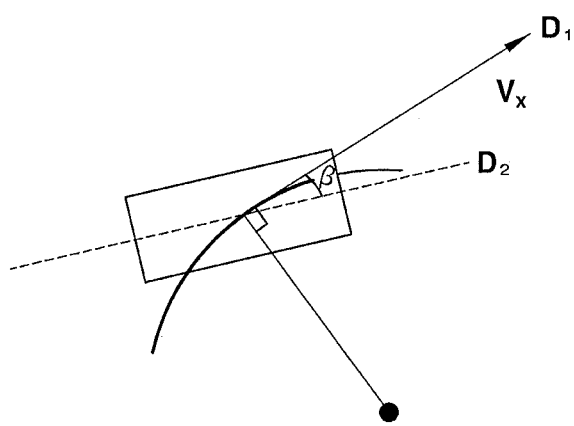

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings for those skilled in the art to easily carry out the embodiments. The present invention may, however, be embodied in various forms, and may not be construed as being limited to the exemplary embodiments set forth herein.

In the entire specification, when an element is referred to as "including" another element, the element may not be understood as excluding other elements when there is no special conflicting description, and the element may include at least one other element.

Various aspects of the present invention are directed to providing an apparatus and a method for controlling a steering system of a vehicle, which are configured for improving a sense of unity between a driver's driving input and vehicle motion and the stability of the vehicle by estimating a side slip angle and appropriately performing return control with respect to the vehicle which is traveling.

According to an exemplary embodiment of the present invention, to improve a sense of unity between the driver's driving input and the vehicle motion and the travel stability while the vehicle is traveling, a side slip angle is estimated based on the current driver's steering input state and the current state of the vehicle, and side slip control is performed to control the side slip angle of the vehicle based on the estimated value.

In an exemplary embodiment of the present invention, the side slip control for improving the sense of unity between the driver's driving input and the vehicle motion and the travel stability aims to minimize the side slip angle and cause the side slip angle to have a positive value.

To control the side slip angle of the vehicle which is traveling, the steering angle needs to be changed. However, if the steering system of the vehicle operates as an active system, which actively changes the steering angle of the vehicle to control the side slip angle, the vehicle may be steered in an unintended direction thereof.

Therefore, the purpose of the present invention is to assist in the accomplishment of the goal of side slip control through torque control, rather than through angle control, which has a direct influence on the driver and the vehicle.

Figure 3:
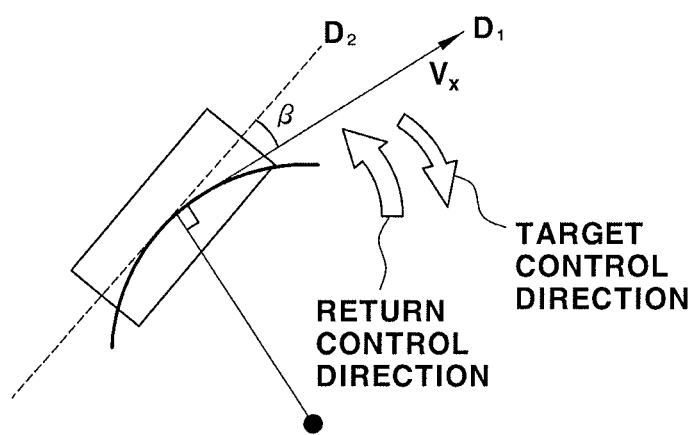
FIG. 3 and FIG. 4 are views showing the vehicle state depending on the side slip angle.

In an exemplary embodiment of the present invention, return control is conducted for torque control. When the vehicle turns along a curved road, as shown in FIG. 3, if the estimated side slip angle β of the vehicle has a positive (+) value (β>0), that is, if the heading direction D2 of the vehicle is oriented in the outward direction of the turning path, the return control direction and the target control direction are opposite each other. Thus, as the absolute value of the side slip angle is increased, the return control amount is decreased.

Figure 4:
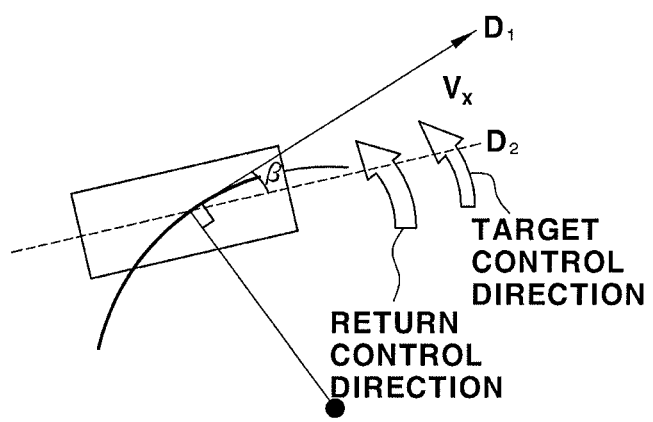

On the other hand, as shown in FIG. 4, if the estimated side slip angle β of the vehicle has a negative (−) value (β<0), that is, if the heading direction D2 of the vehicle is oriented in the inward direction of the turning path, the return control direction and the target control direction are the same as each other. Thus, as the absolute value of the side slip angle is increased, the return control amount is increased.

In an exemplary embodiment of the present invention, the side slip angle β is an angle that represents the degree of slippage of the vehicle relative to the direction in which the vehicle is traveling. As shown in FIG. 3 and FIG. 4, the side slip angle β may be defined as an angle between the velocity direction D1 of the vehicle and the heading direction D2 of the vehicle.

The velocity of the vehicle is a velocity $V_x$ at which the vehicle travels in the longitudinal direction thereof. The velocity direction D1 of the vehicle shown in FIG. 3 and FIG. 4 may be defined as a tangential direction of the path along a curved road along which the vehicle turns.

Hereinafter, an apparatus and a method for controlling a steering system according to an exemplary embodiment of the present invention will be described in more detail with reference to the accompanying drawings.

Figure 5:
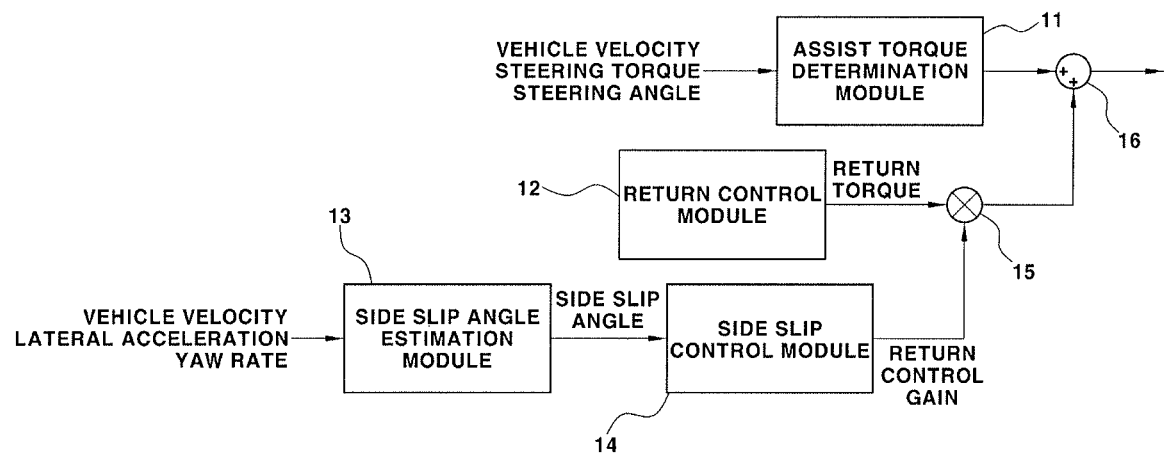
FIG. 5 is a block diagram showing the configuration of a control apparatus according to an exemplary embodiment of the present invention.

FIG. 5 is a block diagram illustrating the configuration of the control apparatus according to the exemplary embodiment of the present invention.

The control apparatus and method according to an exemplary embodiment of the present invention may be applied to a motor driven power steering (MDPS) system or an electronic power steering (EPS) system of the vehicle.

As shown in FIG. 5, the apparatus configured for controlling a steering system according to the exemplary embodiment of the present invention may include an assist torque determination module 11, a return control module 12, a side slip angle estimation module 13, a side slip control module 14, a correction unit 15, and a torque compensation unit 16. These modules may be provided in a controller of the MDPS system or the EPS system.

The assist torque determination module 11 and the return control module 12 are already known generally, and are thus not different from an assist torque determination module and a return control module of a commonly used control apparatus configured for a steering system.

The assist torque determination module 11 is an element for determining assist torque, specifically, torque for assisting steering (steering assist torque), based on driver steering input information and vehicle state information collected from the vehicle.

The driver steering input information and the vehicle state information may be information detected by sensors provided in the vehicle.

The driving input information generated by the driver's steering wheel operation, that is, the driver steering input information, may include a steering angle obtained from a signal from a steering angle sensor and steering torque obtained from a signal from a torque sensor.

Furthermore, the vehicle state information may include a vehicle velocity.

The assist torque determination module 11 determines assist torque for assisting steering based on the driver steering input information, such as a steering angle and steering torque, and the vehicle state information, such as a vehicle velocity.

The return control module 12 is an element for determining steering return torque, which is motor torque for returning the steering wheel, which has been turned by the driver, to the original neutral position (on-center position).

The MDPS system or the EPS system employs return control logic for improving the steering returnability of the vehicle, that is, the returnability of the steering wheel.

While driving the vehicle, if the driver turns the steering wheel to turn a corner and then releases the steering wheel upon completion of turning (upon completion of traveling around a corner), the steering wheel returns to the neutral position due to the steering return torque determined in a response to the return control logic.

The control apparatus according to the exemplary embodiment of the present invention includes a return control module 12 configured to perform the above-described return control logic. Any one of commonly used configurations may be applied to the return control module 12 in the control apparatus according to the exemplary embodiment of the present invention, so long as it is capable of calculating steering return torque.

For example, Korean Patent Registration No. 10-0795102 (Jan. 9, 2008) includes technology of determining steering return torque based on a steering angle and a vehicle velocity or based on a steering angle, a steering angular speed and a vehicle velocity.

Furthermore, Korean Patent Laid-open Publication No. 10-2018-0080401 (Jul. 12, 2018) (or US 2018/0186399 A1) discloses technology of calculating steering return torque based on a vehicle velocity, a yaw rate and steering torque (column torque).

The side slip angle estimation module 13 is an element for estimating the side slip angle β. The side slip angle estimation module 13 may be configured to estimate the side slip angle β based on the vehicle state information.

The vehicle state information for estimating the side slip angle β may include a vehicle velocity $V_x$, a lateral acceleration $a_y$, and a yaw rate $\omega_y$, which are detected by sensors.

That is, the side slip angle estimation module 13 may be configured to determine the side slip angle β by receiving the vehicle velocity $V_x$, the vehicle lateral acceleration $a_y$ and the vehicle yaw rate $\omega_y$, which are detected by sensors.

Figure 6:
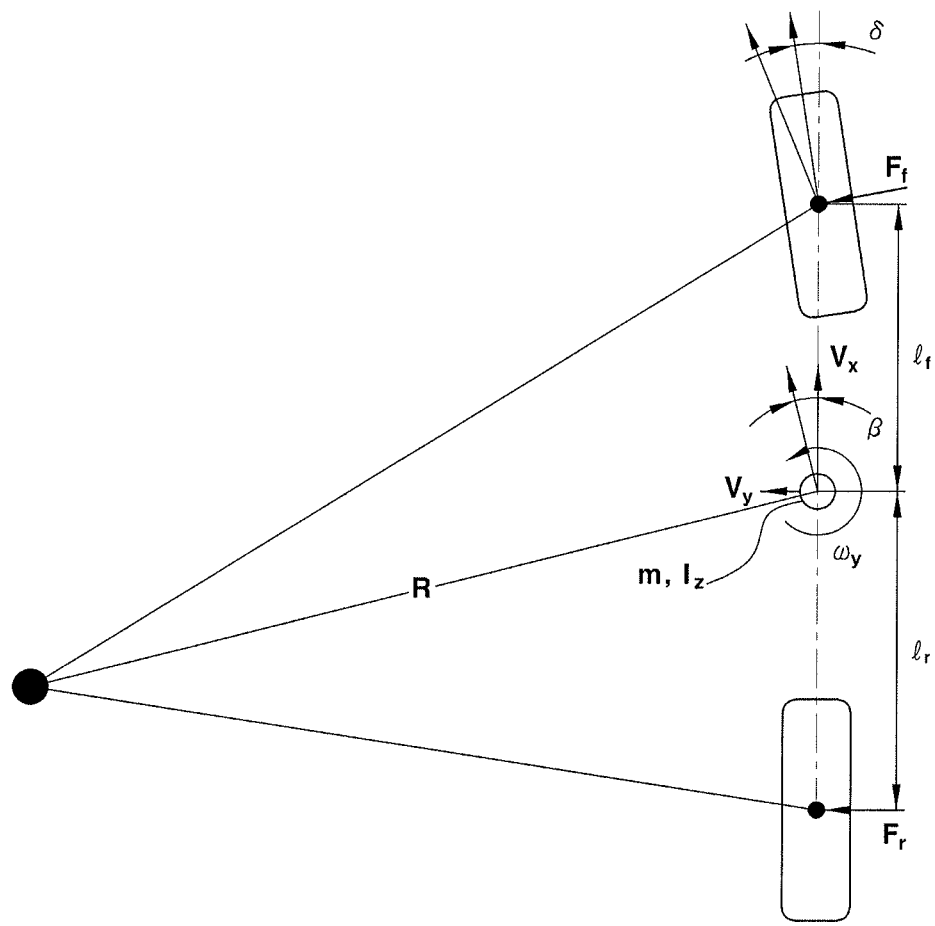
FIG. 6 is a view showing a bicycle model.
Figure 7:
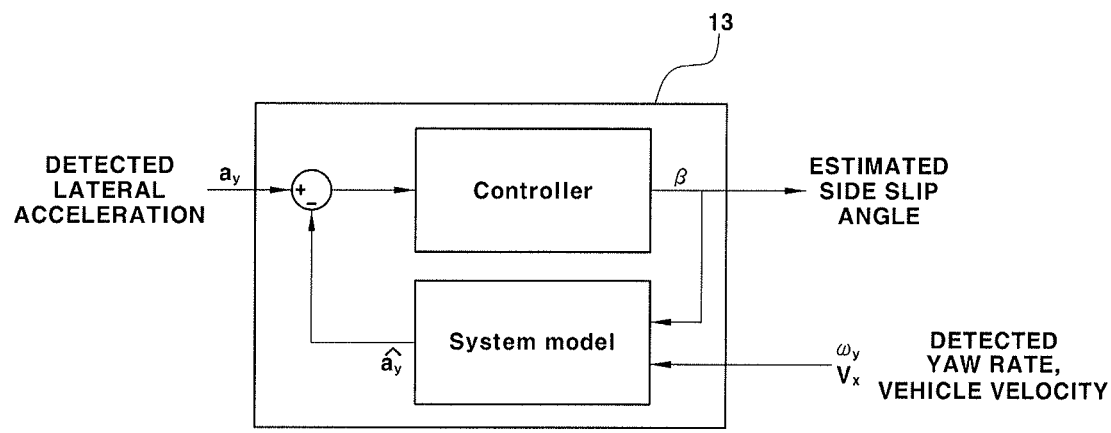
FIG. 7 is a view showing the configuration of an example of a side slip angle estimation module in the control apparatus configured for a steering system of a vehicle according to the exemplary embodiment of the present invention.

FIG. 6 is a view showing a bicycle model as a reference. FIG. 7 is a view exemplarily illustrating the detailed configuration of the side slip angle estimation module 13 according to an exemplary embodiment of the present invention.

In FIG. 6, "R" represents a turning radius, "m" represents a vehicle mass, and "$I_z$" represents a vehicle moment of inertia.

Furthermore, "$F_f$" represents front lateral force, "$F_r$" represents rear lateral force, "$l_f$" represents a distance between the center of gravity of the vehicle and the front wheel axle, and "$l_r$" represents a distance between the center of gravity of the vehicle and the rear wheel axle.

"Vx" represents a vehicle velocity (velocity in the longitudinal direction of the vehicle), "Vy" represents a velocity in the lateral direction of the vehicle, "δ" represents a wheel steering angle, "β" represents a side slip angle of the vehicle, and "$\omega_y$" represents a vehicle yaw rate.

Referring to FIG. 6, the side slip angle β may be expressed by the following Eq. 1 using the velocity $V_x$ in the longitudinal direction of the vehicle (vehicle velocity) and the velocity $V_y$ in the lateral direction of the vehicle.

$$\beta = \frac{V_y}{V_x} \qquad \text{Eq. 1}$$

On the assumption that the vehicle velocity is constant, the vehicle lateral acceleration $a_y$ may be expressed by the following Eq. 2.

$$a_y = \dot{V}_y + \omega_y \cdot V_x \qquad \text{Eq. 2}$$

As a result, the side slip angle β may be expressed by the following Eq. 3 using the vehicle velocity $V_x$, the lateral acceleration $a_y$ and the yaw rate $\omega_y$.

$$\beta = \frac{1}{V_x}\frac{1}{s}a_y - \frac{1}{s}\omega_y \qquad \text{Eq. 3}$$

Here, s is a Laplace transform parameter, and as is known from the above Eq. 3, the side slip angle β may be determined from the vehicle velocity $V_x$, the lateral acceleration $a_y$ and the yaw rate $\omega_y$ by the side slip angle estimation module 13.

An estimator, which utilizes the above Eq. 3 and is applicable to the side slip angle estimation module 13, may be configured as a Kalman filter, a Luenberger observer, a controller output observer, or the like.

FIG. 7 shows a controller output observer, which is an example of the side slip angle estimation module 13 for determining the side slip angle β by receiving the vehicle velocity $V_x$, the lateral acceleration $a_y$ and the yaw rate $\omega_y$.

The side slip control module 14 is configured to receive the side slip angle β determined and estimated by the side slip angle estimation module 13. The side slip control module 14 determines a return control gain, which corresponds to the side slip angle estimate (i.e., the estimated side slip angle) input from the side slip angle estimation module 13, using set information.

The return control gain value is a value determined through tuning in preceding tests and evaluation processes. The set information may be a tuning map, in which a return control gain value is tuned and set to a value corresponding to the side slip angle β.

Figure 8:
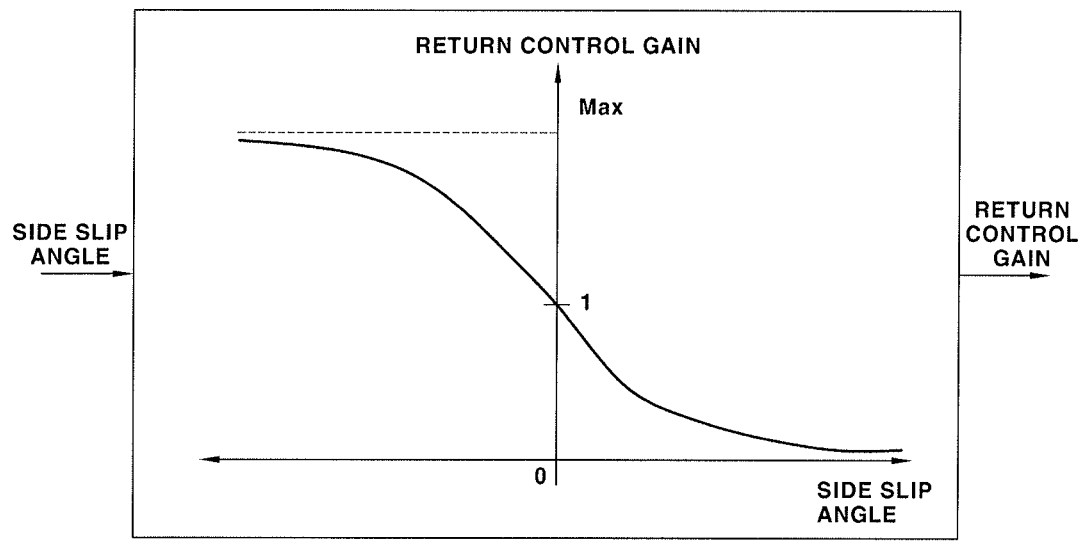
FIG. 8 is a view showing a tuning map, in which a return control gain value is set corresponding to the side slip angle, in the control apparatus configured for a steering system of a vehicle according to the exemplary embodiment of the present invention.

That is, the tuning map is a map in which a return control gain value is set corresponding to the side slip angle β using data obtained from preceding tests and evaluation processes. FIG. 8 is a view exemplarily illustrating a map used to determine a return control gain value from the side slip angle β.

FIG. 8 shows an example of the tuning map, based on which the side slip control module 14 determines a return control gain value using the estimated value, i.e., the estimated side slip angle β, input from the side slip angle estimation module 13.

Referring to FIG. 8, when the side slip angle β has a negative (−) value less than 0 in the map, the return control gain value is set to a value greater than 1, and accordingly, a return control amount is increased.

Here, the increase in the return control amount means an increase in the steering return torque determined by the return control module 12. To the present end, in the region of the map in which the side slip angle β has a negative (−) value less than 0, the return control gain value, which is multiplied by the determined steering return torque, is set to a value greater than 1.

Furthermore, in the region of the map in which the side slip angle β has a negative (−) value less than 0, as the absolute value of the side slip angle is increased, the return control gain value is gradually increased.

On the other hand, when the side slip angle β has a positive (+) value greater than 0 in the map, the return control gain value is set to a value less than 1, and accordingly, a return control amount is decreased.

Here, the decrease in the return control amount means a decrease in the steering return torque determined by the return control module 12. To the present end, in the region of the map in which the side slip angle β has a positive (+) value greater than 0, the return control gain value, which is multiplied by the determined steering return torque, is set to a value less than 1.

Furthermore, in the region of the map in which the side slip angle β has a positive (+) value greater than 0, as the absolute value of the side slip angle is increased, the return control gain value is gradually decreased.

Furthermore, when the side slip angle β is 0 in the map, the return control gain value is set to 1. This means that the steering return torque determined by the return control module 12 is used for return control without being increased or decreased.

In other words, when the return control gain is greater than 1, a return control amount is increased, and when the return control gain is less than 1, a return control amount is decreased.

Furthermore, when the return control gain is tuned in a response to the side slip angle β, the return control gain value is set so as not to exceed a predetermined maximum value Max.

Although, as described above, a map in which a return control gain value is tuned to a value corresponding to the side slip angle β may be used, an equation such as a hyperbolic tangent (Tanh) function may alternatively be used as the set information without tuning the return control gain value.

The correction unit 15 corrects the steering return torque determined by the return control module 12. At the instant time, the steering return torque is corrected by multiplying the steering return torque, determined by the return control module 12, by the return control gain value, determined by the side slip control module 14.

That is, the corrected steering return torque value is derived from the correction unit 15 by multiplying the steering return torque of the return control module 12 by the return control gain value. The corrected steering return torque value derived in the present manner becomes a final steering return torque value.

Subsequently, the torque compensation unit 16 determines final assist torque, which will be output from the steering motor, by compensating the assist torque, determined by the assist torque determination module 11, with the final steering return torque, derived from the correction unit 15.

At the instant time, the torque compensation unit 16 determines the final assist torque by adding the corrected final steering return torque to the assist torque determined by the assist torque determination module 11.

The driving of the steering motor is controlled based on the final assist torque determined in the present manner, realizing the steering assist.

As is apparent from the above description, according to an apparatus and a method for controlling a steering system of a vehicle of the present invention, it is possible to improve a sense of unity between a driver's driving input and vehicle motion and the stability of the vehicle by estimating a side slip angle and appropriately performing return control with respect to the vehicle which is traveling.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for controlling a steering system of a vehicle, the apparatus comprising:
an assist torque determination module configured to determine assist torque for steering assist based on driver steering input information and vehicle state information collected from the vehicle;
a return control module configured to determine steering return torque for returning a steering wheel to a neutral position;
a side slip angle estimation module configured to estimate a side slip angle based on the vehicle state information collected from the vehicle;
a side slip control module configured to receive the side slip angle estimated by the side slip angle estimation module and to determine a return control gain value in a response to the estimated side slip angle;
a correction unit configured to determine final steering return torque by correcting the steering return torque, determined by the return control module, in a response to the return control gain value; and
a torque compensation unit configured to determine final assist torque for the steering assist by compensating the assist torque, determined by the assist torque determination module, with the final steering return torque, determined by the correction unit,
wherein the side slip angle estimation module determines the side slip angle β from a vehicle velocity Vx, a vehicle lateral acceleration ay and a vehicle yaw rate ωy from the following equation, $$\beta = \frac{1}{V_x}\frac{1}{s}a_y - \frac{1}{s}\omega_y,$$

wherein s is a Laplace transform parameter, and
wherein, when the estimated side slip angle β of the vehicle has a positive (+) value (β>0) and an absolute value of the side slip angle is increased, the return control gain value is controlled to decrease, and when the estimated side slip angle β of the vehicle has a negative (−) value (β<0) and the absolute value of the side slip angle is increased, the return control gain value is controlled to increase.

2. The apparatus of claim 1, wherein the side slip control module is configured to determine the return control gain value from the side slip angle estimated by the side slip angle estimation module using a map in which the return control gain value is set corresponding to the side slip angle.

3. The apparatus of claim 2, wherein, when the side slip angle has a negative value less than 0 in the map, the return control gain value is set to a value greater than 1.

4. The apparatus of claim 3, wherein, in a region of the map in which the side slip angle has a negative value less than 0, as an absolute value of the side slip angle is increased, the return control gain value is increased.

5. The apparatus of claim 2, wherein, when the side slip angle has a positive value greater than 0 in the map, the return control gain value is set to a value less than 1.

6. The apparatus of claim 5, wherein, in a region of the map in which the side slip angle has a positive value greater than 0, as an absolute value of the side slip angle is increased, the return control gain value is decreased.

7. The apparatus of claim 2, wherein, when the side slip angle is 0 in the map, the return control gain value is set to 1.

8. A method of controlling a steering system of a vehicle, the method comprising:
- determining, by a controller, assist torque for steering assist based on driver steering input information and vehicle state information collected from the vehicle by the controller;
- determining, by the controller, steering return torque for returning a steering wheel to a neutral position;
- estimating, by the controller, a side slip angle based on the vehicle state information collected from the vehicle;
- determining, by the controller, a return control gain value in a response to the estimated side slip angle;
- determining, by the controller, final steering return torque by correcting the determined steering return torque in a response to the determined return control gain value; and
- determining, by the controller, final assist torque for the steering assist by compensating the determined assist torque with the determined final steering return torque,
- wherein the controller determines the side slip angle β from a vehicle velocity Vx, a vehicle lateral acceleration ay and a vehicle yaw rate ωy from the following equation, $$\beta = \frac{1}{V_x}\frac{1}{s}a_y - \frac{1}{s}\omega_y,$$

wherein s is a Laplace transform parameter, and wherein, when the estimated side slip angle β of the vehicle has a positive (+) value (β>0) and an absolute value of the side slip angle is increased, the return control gain value is controlled to decrease, and when the estimated side slip angle β of the vehicle has a negative (−) value (β<0) and the absolute value of the side slip angle is increased, the return control gain value is controlled to increase.

9. The method of claim 8, wherein, in the determining the return control gain value, the return control gain value corresponding to the estimated side slip angle is determined using a map in which the return control gain value is set corresponding to the side slip angle.

10. The method of claim 9, wherein, when the side slip angle has a negative value less than 0 in the map, the return control gain value is set to a value greater than 1.

11. The method of claim 10, wherein, in a region of the map in which the side slip angle has a negative value less than 0, as an absolute value of the side slip angle is increased, the return control gain value is increased.

12. The method of claim 9, wherein, when the side slip angle has a positive value greater than 0 in the map, the return control gain value is set to a value less than 1.

13. The method of claim 12, wherein, in a region of the map in which the side slip angle has a positive value greater than 0, as an absolute value of the side slip angle is increased, the return control gain value is decreased.

14. The method of claim 9, wherein, when the side slip angle is 0 in the map, the return control gain value is set to 1.

* * * * *